United States Patent
Dorais

(10) Patent No.: US 12,325,922 B2
(45) Date of Patent: Jun. 10, 2025

(54) METHOD AND APPARATUS FOR SPLITTING WATER MOLECULES INTO CONSTITUENT HYDROGEN AND OXYGEN GASES

(71) Applicant: CLENTECH H2, LLC, Boca Raton, FL (US)

(72) Inventor: Robert J. Dorais, West Chester, PA (US)

(73) Assignee: Clentech Management Co. LLC, Port Saint Lucie, FL (US)

( * ) Notice: Subject to any disclaimer, the term of this patent is extended or adjusted under 35 U.S.C. 154(b) by 0 days.

(21) Appl. No.: 17/535,350

(22) PCT Filed: Nov. 24, 2021

(86) PCT No.: PCT/US2021/060806
§ 371 (c)(1),
(2) Date: Nov. 24, 2021

(87) PCT Pub. No.: WO2022/115593
PCT Pub. Date: Jun. 2, 2022

(65) Prior Publication Data
US 2023/0332298 A1    Oct. 19, 2023

Related U.S. Application Data

(60) Provisional application No. 63/117,687, filed on Nov. 24, 2020.

(51) Int. Cl.
*C25B 1/04* (2021.01)
*C25B 9/05* (2021.01)
(Continued)

(52) U.S. Cl.
CPC ............. *C25B 1/04* (2013.01); *C25B 9/05* (2021.01); *C25B 9/17* (2021.01); *C25B 9/65* (2021.01)

(58) Field of Classification Search
CPC .... C25B 1/04; C25B 9/05; C25B 9/17; C25B 9/65; C25B 11/02; C25B 15/081; C25B 1/044; F02M 25/12; Y02E 60/36
See application file for complete search history.

(56) References Cited

U.S. PATENT DOCUMENTS 4,936,961 A * 6/1990 Meyer .................... C01B 3/042
204/157.52
7,793,621 B2   9/2010 Stehl et al.
(Continued)

FOREIGN PATENT DOCUMENTS

DE    102008037570 A1    6/2010

OTHER PUBLICATIONS

Search Report and Written Opinion issued for International Patent Application No. PCT/US2021/060806, dated Feb. 25, 2022, 9 pages, ISA/US.

*Primary Examiner* — Jacob M Amick
*Assistant Examiner* — Charles J Brauch
(74) *Attorney, Agent, or Firm* — Haynes and Boone, LLP; Mark A. Tidwell

(57) ABSTRACT

A hydrogen-oxygen gas production method and assembly includes a housing defining an interior water chamber with first and second electrodes extending into the water chamber and a first plurality of transducers positioned within the chamber and spaced apart from one another. A second plurality of transducers is positioned within the chamber and in electrical communication with the first electrode but spaced apart from the first transducers. A third plurality of transducers is position within the chamber and in electrical communication with the second electrode but spaced apart from the first and second transducers. Finally, first and second spaced apart frequency plates are mounted adjacent the transducers. In operation, a voltage field is applied to a volume of water in the chamber and simultaneously, a (Continued)

frequency field is applied across the volume of water to create hydrogen-oxygen gas at the surface of the water.

17 Claims, 4 Drawing Sheets

(51) Int. Cl.
*C25B 9/17* (2021.01)
*C25B 9/65* (2021.01)

(56) References Cited

U.S. PATENT DOCUMENTS

| | | |
|---|---|---|
| 8,282,811 B2 | 10/2012 | Kosek et al. |
| 10,753,275 B2 | 8/2020 | Mills |
| 2012/0058405 A1 | 3/2012 | Kirchoff et al. |

\* cited by examiner

METHOD AND APPARATUS FOR SPLITTING WATER MOLECULES INTO CONSTITUENT HYDROGEN AND OXYGEN GASES

CROSS REFERENCE TO RELATED APPLICATION

This application is a U.S. national stage patent application of International Patent Application No. PCT/US21/60806, filed on Nov. 24, 2021, which claims priority to U.S. Provisional Application No. 63/117,687, filed Nov. 24, 2020, all of the benefits of which are claimed and the disclosures of which are incorporated by reference in their entireties.

TECHNICAL FIELD

The present disclosure relates generally to production of hydrogen, and, more specifically, to a hydrogen-oxygen gas (HHO) generator.

SUMMARY OF INVENTION

Disclosed herein is a net-positive, non-electrolysis hydrogen-oxygen generation system based on the breakdown of the water molecule by applying an electronic signal and constant voltage that breaks the electrostatic balance of ionic water molecule bonds causing the molecule to rupture and consequently release hydrogen and oxygen atoms. A sealed, non-conductive housing defines an interior water chamber in which conductive, insulated transducers are positioned within a volume of water. Frequency plates are mounted on the exterior of the water chamber. An electronic signal is applied to the frequency plates from a frequency generator and a voltage field is generated adjacent the transducers from a direct current voltage source. The housing may include a water inlet for supplying water to the chamber, and a gas outlet for drawing hydrogen and oxygen gas from the housing. The application of the electronic signal and voltage to the water facilitates rupture of the ionic water molecule bond on the surface of the conductive, insulated transducers. The transducers act as a conductive medium in contact with water molecules allowing the electronic signal and direct current voltage to interact with the water molecules. In one or more embodiments, the system is in a closed, hermetically sealed housing using potable water and applying a negative pressure inside the closed housing at the surface of the water to facilitate extraction of the gases from the housing. Negative pressure is achieved by means of a negative pressure pump connected to the housing outlet and is utilized to regulate the pressure inside the housing. Negative pressure assists the natural expansion of gases once the gases bubble up to the surface. The optimal frequency to break or rupture the ionic bond of water is defined herein as the rupture frequency. The rupture frequency and its amplitude, and the direct current voltage level, and negative pressure applied may be adjusted based on the dimensions, construction and placement of the transducers, as well as the configuration of the closed housing and the type of circuit used to transmit the signal. Other harmonics of the rupture frequency can be used to achieve similar results.

The external circuit to generate the rupture frequency signal for the present invention can be analog or digital. The transducers inside the sealed housing can be piezoelectric inserts, ferrite plates, coiled magnets or other medium that are responsive to the rupture frequency. Transducer material can be metallic or other materials such as superconductors like graphene that are responsive to the rupture frequency. Transducers can be interleaved either sequentially, parallel, crossed or other configurations in order to maximize as many molecular rupture points as possible.

Transducer performance adjustments can be accomplished in five ways (5) ways to adjust the production of gases; 1) Frequency adjustment of the rupture frequency; 2) Amplitude adjustment of the rupture frequency; 3) Voltage level adjustment of the input direct current voltage; 4) Transducer positioning, i.e, spacing, adjustments; 5) Negative pressure adjustments.

The sealed, non-conductive housing has ports for water and gas. The water port may be a quick-connect coupling, or other means of sealed connection, allowing for a supply of water to maintain a constant level of water inside the sealed, non-conductive housing. The gas port may be a quick-connect coupling, or other means of sealed connection and may serve two purposes. First it provides a means of applying a negative pressure inside the sealed housing. The negative pressure is achieved by an external, low-pressure pump connected directly to the outlet port. Second it provides a means for drawing hydrogen-oxygen gas out of the sealed housing as the gases are produced by the apparatus. The hydrogen-oxygen gas (HHO) produced by the apparatus is passed through the low-pressure pump for downstream uses.

BRIEF DESCRIPTION OF DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Reference is now made to the figures depicting various non-limiting embodiments of the present invention.

Figure 1:
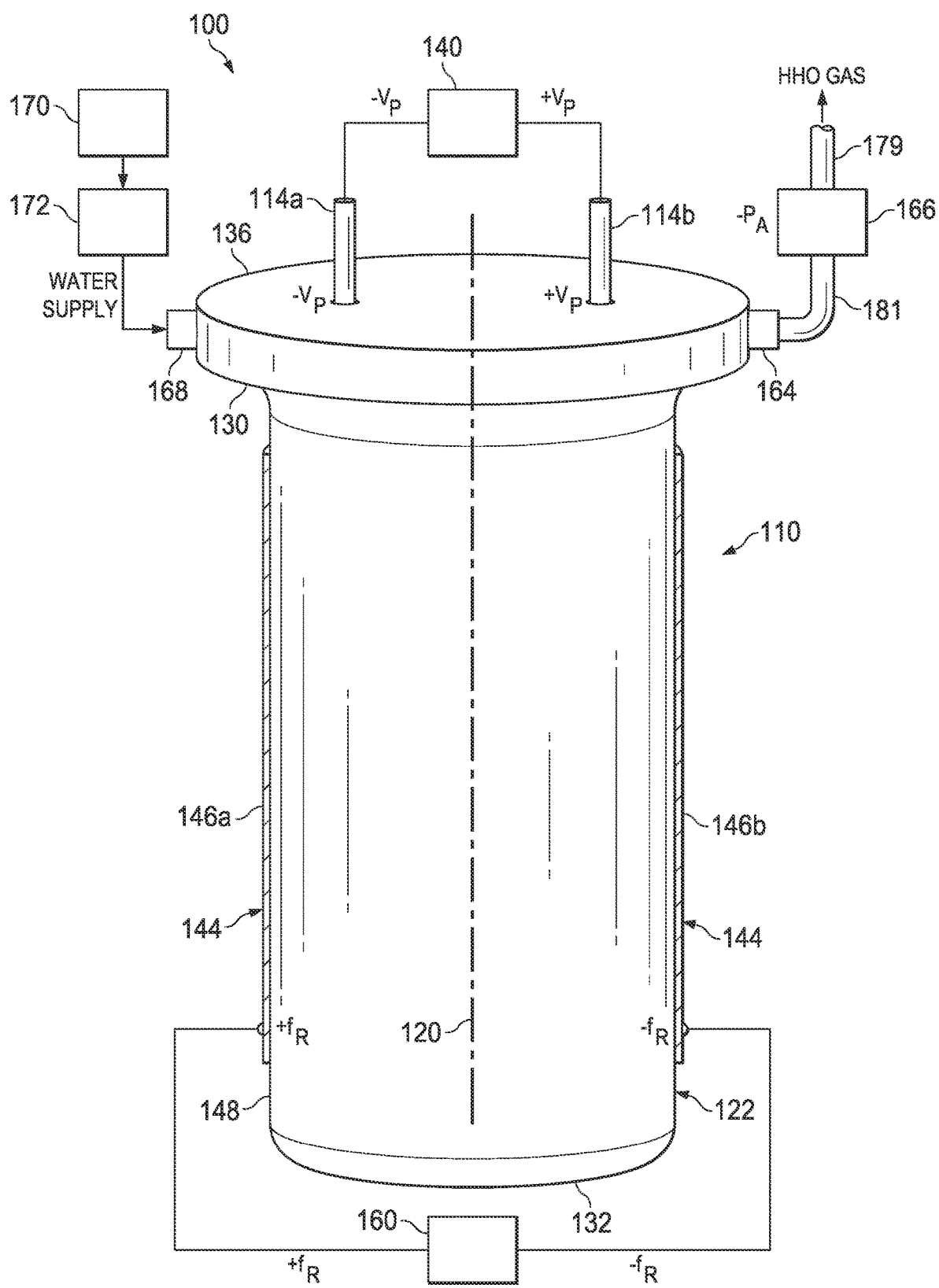
FIG. 1 is an external front view of the net-positive, non-electrolysis HHO gas generator system of the disclosure.

With particular reference now to FIGS. 1 and 2, a hydrogen-oxygen ("HHO") gas generator system 100 is illustrated as having a housing 110. In some embodiments, the housing 110 may be sealed or otherwise hermetically closed. The housing 110 is non-conductive and defines an interior water chamber 112 in which conductors 114 and various transducers 116 are positioned to facilitate separating water molecule in a volume of water 118 by means of electrical and electronic methods to produce hydrogen-oxygen gas. In one or more embodiments, housing 110 is elongated, extending along a primary axis 120 as a non-conductive cylinder or prism 122. In the illustrated embodiment, housing 110 is a cylinder 122. In one or more embodiments, cylinder 122 may have dimensions of approximately 5 inches diameter and 10 inches height and a capacity of 1000 ml, however, the housing 110 is not restricted to any particular dimension, shape or water volume capacity. Other sizes for the housing 110 can be employed depending on system requirements of a particular application. Regardless of the shape, housing 110 may be described as having an upper portion 124 and a lower portion 126.

In one or more embodiments, housing 110 is elongated, extending along a substantially vertical primary axis 120 as a non-conductive cylinder or prism in which a stack of transducers 116 may be positioned. This allows for maximum exposure of the water molecules to be ruptured in relation to the electronic and electrical forces acting on them. It has been found that optimal voltage and signal levels may vary depending on the size and shape of the housing. As a non-limiting example, optimal voltage and signal levels are 12-48 volts and 100 Khz to 10 Mhz, respectively, for a 1000 ml, cylindrical housing. The dimensions of the housing impact signal strength of the rupture frequency ($f_R$) across the body of water 118 within the housing 110 with dimensions of approximately 5 inches diameter and 10 inches height. Larger diameter housings may require more energy to propagate a signal.

While housing 110 is depicted as an elongated, substantially vertical cylinder, in other embodiments, the primary axis 120 of housing 110 may be substantially horizontal. Where housing 110 is elongated and extends along a primary axis 120, housing 110 can be characterized as having a first end wall 130 and a second end wall 132 with a housing wall extending between the first and second end walls 130, 132. In some embodiments, housing 110 has a length along the primary axis 120 that is at least twice diameter of the cross-section of the housing. Likewise, while housing 110 is depicted as a cylinder with a circular cross-section (see FIG. 2B), housing 110 may have an oval cross-section or housing 110 may be a polygon in cross-section so as to have at least three sides. Thus, as shown in FIG. 2C, housing 110 may have a square or rectangular cross-section with opposing flat sides.

A first electrode 114a and a second electrode 114b extend into housing 110 and the interior water chamber 112. Each electrode may be a rod or other conductive element. Although the electrodes 114 are not limited to a particular orientation or position, in one or more embodiments as illustrated, the electrodes 114a, 114b may be conductive rods positioned to extend from the upper portion 124 of housing 110 down into interior water chamber 112 of housing 110, substantially parallel with the primary axis 120 of housing 110. While two electrodes 114a, 114b are shown in the illustrated embodiment, in other embodiments, three or more or a plurality of electrodes 114 may be provided. In the illustrated embodiment, each electrode 114a, 114b is shown extending through the top 136 of the housing 110. Moreover, electrodes 114 may extend substantially along the length of housing 110. In any event, the conductive electrodes 114a and 114b are connected to a voltage source 140. In one or more embodiments, the voltage source 140 provides a continuous direct current voltage ($V_P$). The voltage source 140 is shown connected to electrode 114a as a negative polarity, and electrode 114b as a positive polarity, although the electrodes 114 are not limited to a particular polarity. As used herein, "upper portion 124 of housing 110" refers to the portion of housing 110 to which gases produced within housing 110 rise and in which such gasses collect at or above the surface 142 of the water volume 118 for removal from housing 110, regardless of the shape of housing 110.

Carried by housing 110 is a frequency propagation mechanism 144 for introducing a rupture frequency within housing 110. In one or more embodiments, frequency propagation mechanism 144 may be two or more spaced apart frequency plates 146. In one or more embodiments, frequency propagation mechanism 144 may be a plurality of frequency plates 146 spaced apart from one another. In the illustrated embodiment of FIGS. 1 and 2A, two frequency plates 146a, 146b are shown. In other embodiments, frequency propagation mechanism 144 may be inductors, piezo electric elements or one or more lasers. Similarly, frequency propagation mechanism 144 may be mechanical, sonic, ultrasonic, or pneumatic. Thus, in some embodiments, frequency propagation mechanism 144 is formed of a first frequency plate 146a and a second frequency plate 146b. In one or more embodiments, such as is illustrated, frequency plates may be mounted on the exterior 148 of housing 110 along the housing wall 150 or otherwise externally from the interior water chamber 112. In one or more embodiments, first and second frequency plates 146a, 146b are mounted on opposite sides of housing 110 so as to oppose one another. In one or more embodiments, first and second frequency plates 146a, 146b are elongated, conductive metal strips. In one or more embodiments, first and second frequency 146a, 146b plates may be formed of ferrite elements. First and second frequency plates 146a, 146b extend along at least a portion of the length of housing 110, and in one or more embodiments, extend from adjacent the first end wall 130 to adjacent the second end wall 132. First and second frequency plates 146a, 146b are used to propagate a transmitted frequency signal between them from an external frequency source 160 for use internally in housing 110. The frequency signal is defined as the rupture frequency ($f_R$) and is used to facilitate the separation of the water molecule into hydrogen-oxygen gases, HHO.

Figure 2A:
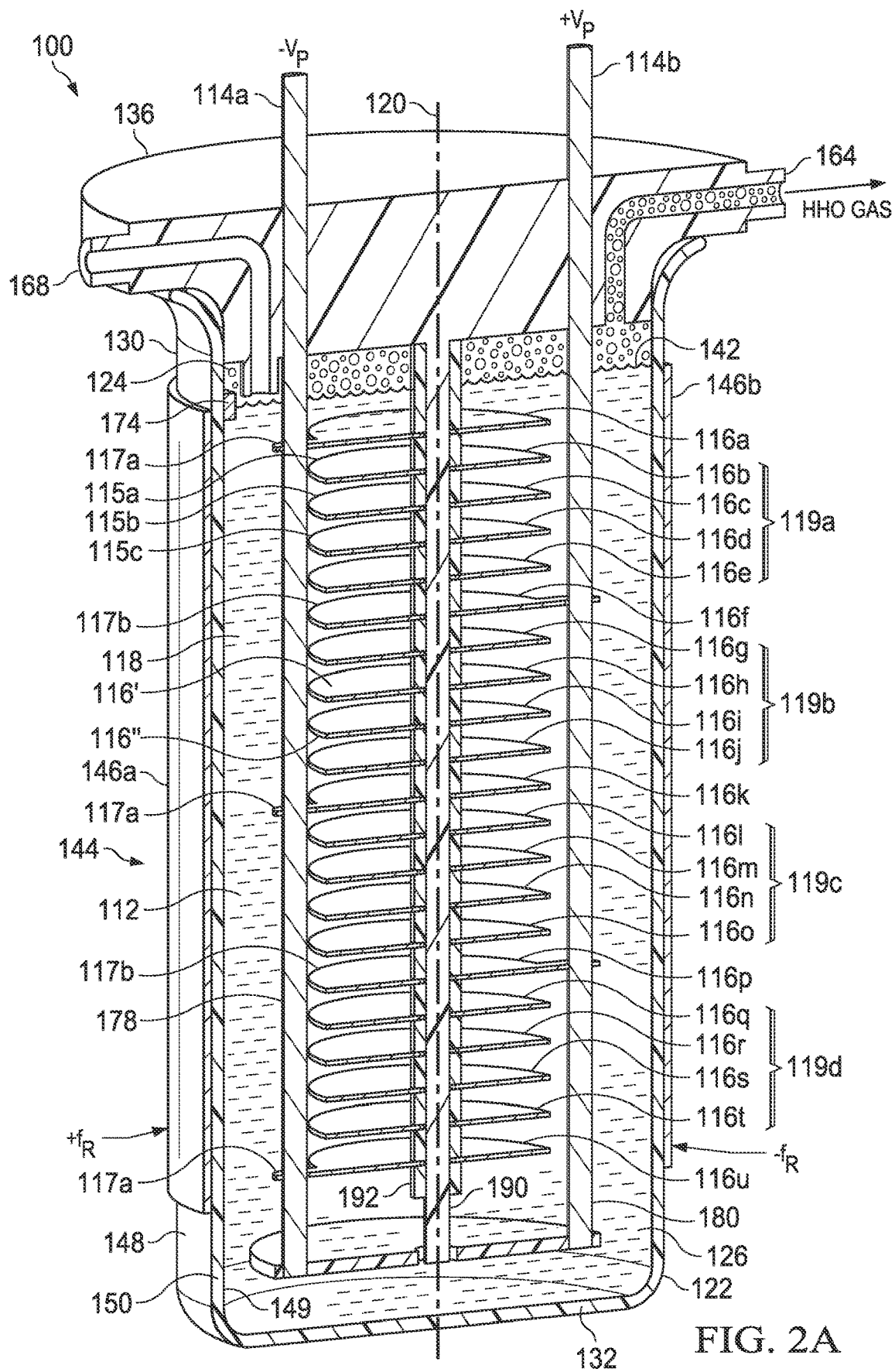
FIG. 2A is a front sectional view of the of the net-positive, non-electrolysis HHO gas generator system water chamber configured using elongated transducers in the system of the disclosure.
Figure 2B:
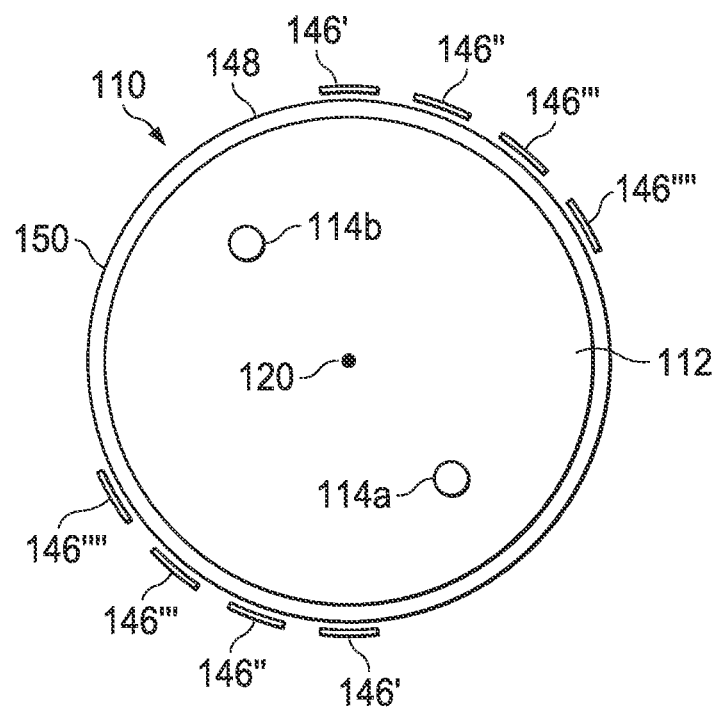
Figure 2C:
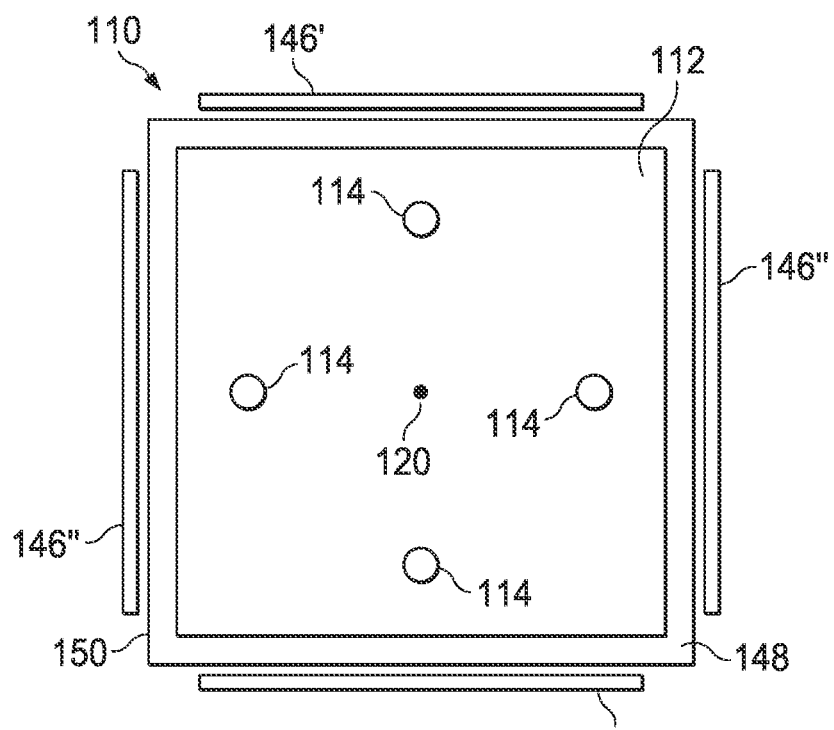

As best seen in FIGS. 2B and 2C, in one or more embodiments, two or more or a plurality of sets of opposing frequency plates 146 may be disposed about housing 110, which each set 146′ 146″, 146‴ and 146⁗ formed of two frequency plates, such as frequency plates 146a, 146b, that oppose one another across chamber 112. Frequency source 160 may be used to alternatively generate a frequency between the plates 146 of each set of frequency plates. In this regard, a different frequency may be applied to different sets of opposing frequency plates 146, or the same frequency may be progressively applied to each set of frequency plates, one set of frequency plates at a time, to achieve molecule separation as described herein.

Where housing 110 has a circular cross-section, the two spaced apart frequency plates 146a, 146b may be spaced approximately 180 degrees apart from one another about the circumference of the housing, and where housing 110 has a polygonal cross-section, the two spaced apart frequency plates may be mounted on opposing walls of the housing 110. Similarly, where housing 110 has a circular cross-section, each frequency plate 146 may be semicircular in shape and may wrap around a portion of the exterior 148 of housing 110. In one embodiment, where housing 110 is a cylinder with dimensions approximately 5 inches diameter and 10 inches height and a capacity of 1000 ml, frequency plates 146a, 146b may be rectangular, of approximately 8-10 inches in height and approximately 2 inches wide. In one or more embodiments, the ratios between diameter, height and measurements of other components identified herein are scalable. For example, a cylinder diameter to length may be approximately 1:2 and frequency plate width to cylinder diameter may be approximately 2:5.

In one or more embodiments such as best seen in FIG. 2B, a plurality of first frequency plates and a plurality of second frequency plates may be provided. The plurality of first frequency plates may be interleaved with the plurality of second frequency plates about the perimeter of the housing 110.

Housing 110 may include a first fluid port 164 adjacent the upper portion 124 of housing 110. In the illustrated embodiment, the first fluid port 164 is shown adjacent the first end wall 130. In any event, first fluid port 164 is a gas outlet in fluid communication with a low-pressure pump 166, such as a vacuum pump, for removing HHO gases accumulated in the upper portion 124 of housing 110 as described herein.

It will be appreciated that as molecules are ruptured as described herein and HHO gas generated, the volume of water 118 in housing 110 will be depleted. Although not necessary for operation of HHO gas generator 110, in one or more embodiments, housing 110 may include a second fluid port 168 to provide a continuous or intermittent supply of water. Although the second fluid port 168 is not limited to a particular position, in the illustrated embodiment, second fluid port 168 is shown adjacent the upper portion 124 of housing 110. However, in other embodiments, second fluid port may be adjacent the lower portion 126 of housing 110, or anywhere along a wall 150 of housing 110. In any event, second fluid port 168 is a water inlet in fluid communication with a water source 170, such as a water storage tank, for supplying water to housing 110. A water pump 172 may be provided to assist in pumping water from the water source to housing 110.

Fluid ports 166, 168 may be quick-connect coupling connectors. Second fluid port 168 may be utilized to maintain a constant water level internally within housing 110. In this regard, a sensor 174 may be provided within housing 110 to monitor the volume of water 118 within housing 110 and maintain a desired water level via operation of water pump 172. In one or more embodiments, sensor 174 may be positioned adjacent the upper most transducer 116, which is shown as a polarity transducer 117 in the illustrated embodiment of FIG. 2A.

First fluid port 164 has two functions. First, first fluid port 164 provides a means of applying a negative pressure $(-P_A)$ inside the sealed housing 110 to assist the natural expansion of gases once the gases bubble up to the surface 142 of the volume of water 118 within housing 110. Second, first fluid port 164 provides a means to draw out the hydrogen-oxygen gases produced internally in the sealed housing 110.

Thus, in one or more embodiments, external to the housing 110, is a low-pressure pump 166. The low-pressure pump 166 is in fluid communication with first fluid port 164. Pump 166 may also include an outlet 179 to flow the hydrogen-oxygen gases produced by the apparatus 110 for external uses. The low-pressure pump 166 provides a negative pressure $(-P_A)$ through a sealed conduit 181 connected to the first fluid port 164. The negative pressure $(-P_A)$ assists the natural expansion of gases once the gases bubble up to the surface 142 of water volume 118. In addition, the low-pressure pump 166 draws out under negative pressure $(-P_A)$, the hydrogen-oxygen gases produced in housing 110 for downstream uses.

With particular reference now to FIG. 2A, the internal mechanical schematic of HHO gas generator system 100 is illustrated. As shown, housing 110 is formed of a housing wall 150 having an exterior surface 148 and an interior surface 149 and defines a cavity in the form of an interior water chamber 112 which is disposed to receive a volume of water 118. In some embodiments, housing 110 may have a first surface or end 130 spaced apart from a second surface or end 132 with a housing wall 150 extending between the first and second surfaces 130, 132 to define the interior water chamber 112. Where the primary axis 120 of housing 110 is substantially vertical, the first surface 130 is an upper or top surface and the second surface 132 is a lower or bottom surface.

In one or more embodiments, the volume of water 118 disposed within the interior water chamber is potable water. Significantly, the volume of water 118 need not include any electrolytes to facilitate operation of the system 100, unlike the need for electrolytes in other prior art systems to enhance or aid chemical reactions. Thus, simple tap water may be utilized by the system 100. In any event, submerged within the volume of water 118 are transducers 116, that, in conjunction with the frequency plates 146, facilitate separating water molecules by means of electrical and electronic methods to produce hydrogen-oxygen gases.

Water of at least potable quality is used to fill the interior water chamber 112 forming a water volume 118. Where housing 110 is vertical and elongated, this water volume 118 forms a water column, where the pressure in the water column facilitates migration of gases formed along transducers 116 to the upper portion 124 of housing 110. In one or more embodiments, water enters housing 110 through fluid port 168. In one or more embodiments, a desired water level is maintained within the interior water chamber 112 by a continuous or intermittent supply of water from water source 170 (see FIG. 1). For example, in one embodiment having the dimensions identified herein, the water volume may be maintained at approximately 1000 ml within housing 110. As water is consumed in the process of generating hydrogen-oxygen gases inside housing 110, the interior water chamber 112 may be kept at a substantially full level from an external water source 170 through fluid port 168 to maintain optimal performance. In one embodiment, the external water source 170 may be a water tank or water vessel. In some embodiments, the external water source 170 may be a water utility supply line, such as may service a building or house (not shown).

In one or more embodiments, such as is illustrated in FIG. 2A, frequency plates 146a 146b may be spaced apart from the interior water chamber 112 along the exterior surface 148 of wall 150, however in other embodiments, frequency plates 146a 146b may be disposed along the inner surface 149 of wall 150 within the interior water chamber 112, preferably in spaced apart relation to one another. In one or more embodiments where a housing 110 is circular in cross-sectional shape, the frequency plates 146 may be semicircular or arcuate in shape and spaced apart from one another approximately 180 degrees about the circumference of the housing 110. Similarly, in one or more embodiments, frequency plates 146a 146b may be disposed to extend generally parallel with the primary axis 120 of housing 110, while in other embodiments, frequency plates 146a 146b may have other orientations. In this regard, while frequency plates 146a 146b are shown mounted along the housing wall 150, in other embodiments, frequency plates 146a 146b may be mounted on the ends or other surfaces of housing 110. It will be appreciated that while frequency plates 146a 146b are described in certain embodiments as mechanism for introducing a rupture frequency into the interior water chamber, in other embodiments, other types of frequency propagation mechanisms 144 may be used to introduce a frequency to the volume of water 118.

In FIG. 2A, first and second electrodes 114a 114b are shown extending into the interior water chamber 112. Although the electrodes 114 need not have any particular configuration relative to housing 110 or each other, in one or more embodiments, electrodes 114a 114b are elongated and extend in spaced apart, substantially parallel relationship to one another about the primary axis 120 of housing 110. Thus, where housing 110 is a substantially vertical cylinder, such as shown in FIG. 2A, electrodes 114a 114b are likewise substantially vertical. Electrodes 114a 114b may be any conductor. In one or more embodiments, electrodes 114a 114b may be a rigid metal structure, such as a bar or plate, and as such, may provide a structure on which other components within interior water chamber can be mounted. In some embodiments, the rigid metal structure may be insulated. In one or more embodiments, electrodes 114a 114b may simply be a wire, such as for example, an insulated wire. Electrodes 114a 114b are preferably positioned to be in-between opposing frequency plates 146a 146b. In the illustrated embodiment, electrodes 114a 114b extend within non-conductive supports 178, 180 positioned within housing 110.

Also disposed within the interior water chamber are a plurality of spaced apart transducers 116. As will be described, transducers 116 include isolated transducers 115 and polarity transducers 117. In one or more embodiments, transducers 116 may be conductive plates having an exposed surface area across the plate. While such plates may be flat, in other embodiments, such plates may be rigged or baffled to increase the exposed surface area across the plate. The plate may have a first face 116' and a second face 116", with a perimeter around the boundary of the plate. The plate may be a thin plate with a deminimis thickness compared to the surface area across the faces 116', 116" of the plate. In this regard, one or more transducers 116 may be formed of ferrite or other metal. While transducers 116 need not be limited to a particular shape or configuration, in one or more embodiments, transducers 116 may be round or polygonal conductive plates. Moreover, while transducers 116 are preferably spaced apart from one another a uniform distance, the spacing between successive transducers 116 need not be.

In the illustrated embodiment, at least one isolated transducer 115 is positioned within the interior water chamber and isolated from electrodes 114a 114b, such as is illustrated by isolated transducer 115a (also shown as transducer 116b). In some embodiments, two or more isolated transducers 115a, 115b . . . 115(n), spaced apart from one another, may form a set or stack 119 of isolated transducers 115, such as shown as transducer stacks 119a-119d in FIG. 2A. Although a set 119 of isolated transducers 115 need not be limited to a particular number of isolated transducers 115, in the illustrated embodiment, a set 119 of isolated transducers 115 is shown having four transducers, namely isolated transducers 115a, 115b, 115c and 115d. As used herein, "isolated" refers to a transducer 116 that is insulated from electrical contact with any other transducer. At least a portion of an isolated transducer 115 is exposed to water volume 118, such as faces 116', 116" as described above in the general description of a transducer 116.

Each set 119 of isolated transducers 115 is bounded by polarity transducers 117, where one polarity transducer 117a bounding a set 119 having a first polarity and one polarity transducer 117b bounding a set 119 having a second polarity opposite the first polarity. As such, a first polarity transducer 117a is in electrical contact with the first electrode 114a positioned on one side of the set 119 of isolated transducers 115, and a second polarity transducer 117b in electrical contact with the second electrode 114b is positioned on an opposing side of the set 119 of isolated transducers 115. Regardless of the number of sets 119 of isolated transducers 115, each set 119 of isolated transducers 115 is bounded by a first polarity transducer 117a and a second polarity transducer 117b so as to form an electrical field between the first polarity transducer 117a and the second polarity transducer 117b when energized. As will be appreciated, the set of isolated transducers 115 is positioned within the electrical field.

Thus, the isolated transducers 115 may form a first plurality of transducers, which first plurality of transducers may consist of one or more sets 119 of isolated transducers 115, where a set 119 of isolated transducers may consist of at least one isolated transducer 115. Likewise, a second plurality of transducers 117a and a third plurality of transducers 117b may be provided, wherein the second plurality of transducers 117a are first polarity transducers and the third plurality of transducers 117b are second polarity transducers. As shown, a set 119 of from the first plurality of transducers 115 are positioned between a transducer 117 from the second plurality of transducers 117a and a transducer 117 from the third plurality of transducers 117b. In other words, the set 119 from the first plurality of transducers are positioned between a transducer which may have a positive charged, such as transducer 117b, and a transducer which may have a negative charge, such as transducer 117a. Although not limited to a particular number of isolated sets 119 from the first plurality of transducers, in the illustrated embodiment, four isolated sets 119a-119d of transducers are illustrated. However, fewer or more sets 119 of isolated transducers 115 may be utilized based on the shape and dimensions of housing 110. Likewise, although not limited to a particular number of isolated transducers 115 within any given set 119 of isolated transducers, in the illustrated embodiment, four isolated transducers 115a-115d are illustrated within each set 119 of isolated transducers. However, fewer or more isolated transducers 115 within any given set 119 may be utilized. In this regard, the number of isolated transducers 115 need not be the same for each set 119 of isolated transducers. Thus, a first set 119a of isolated transducers 115 may have a different number of transducers than a second set 119b of isolated transducers 115.

As a non-limiting example, in the illustrated embodiment of FIG. 2A, twenty-one transducers 116a-116u in the form of metal plates are disposed within a cylindrical, substantially vertical housing 110. All transducers 116a-116u are mounted on non-conductive mechanical supports 178, 180. An additional non-conductive support 190 may extend between adjacent transducers 116. Along support 190, each of the transducers 116a-116u are electrically isolated from adjacent transducers by non-conductive spacers or bushings 192. As shown, transducers 116a, 116k, and 116u are connected to conductive rod 114a, the negative polarity of the external direct current voltage source 140. Transducers 116f and 116p are connected to conductive rod 114b, the positive polarity of the external direct current voltage source 140. This arrangement sets up four zones of voltage potential supplied by voltage source 140. Each zone contains a set 119 of four isolated or "neutral" transducers 115, namely 116b, 116c, 116d and 116e; 116g, 116h, 116i and 116j; 116l, 116m, 116n, 116o; and 116q, 116r, 116s, 116t. A direct current voltage source 140 generates an electrical potential across each zone and between each transducer within a set 119. This electrical field helps facilitate the separation of the water molecule in particular along the surface of the isolated transducers 115 when used in conjunction with the electronic signal rupture frequency ($f_R$).

In one embodiment of a hydrogen generator, two externally mounted conductive frequency plates 146a, 146b in the form of conductive metal ferrite strips are positioned on opposite sides and external to the housing 110. Frequency plates 146a and 146b transverse the height of the housing 110 from adjacent the bottom end 132 housing 110 to adjacent the top end 130 of housing 110. The frequency plates 146a and 146b are used to propagate the rupture frequency ($f_R$) signal to the interior water chamber 112 and in particular, to the transducers 116a-116u to facilitate breaking electrostatic ionic bond of water molecules within the interior water chamber 112 along the exposed surface of transducers 116, and in some embodiments, particularly along the surfaces of isolated transducers 115.

In operation of HHO gas generator system 100, hydrogen gas and oxygen gas can be generated from water by applying a voltage field to a volume of water while generating a frequency field across the volume of water. In one or more embodiments, to further facilitate the process, a negative pressure can be applied to the surface of the volume of water. The process ruptures the ionic bond of water molecules, splitting the water molecules into hydrogen gas and oxygen gas. In particular, the water molecules are split at the surface of isolated, conductive plates 115 disposed within the voltage field generated by polarity plates 117. It will be appreciated that the gas formed by splitting the water molecules will migrate to the upper portion 124 of the chamber in which the process is performed, and in particular to the surface 142 of a water volume 118. As such, the produced hydrogen gas and oxygen gas may be drawn from the surface 142 of the volume of water 118. In other embodiments, hydrogen gas and oxygen gas can be generated from water by applying a voltage across a volume of water 118 within a pressure chamber 110 and propagating an electronic signal at a select frequency through the volume of water 118. Again, a negative pressure may be applied to the surface 142 of the water volume 118 within the pressure chamber 112. In some embodiments, the voltage may be a constant voltage, while in other embodiments, the voltage may be an alternating current voltage. In some embodiments, the voltage may be a direct current voltage. In some embodiments, the voltage may be approximately 12 volts. In some embodiments, the voltage may range from approximately 12-48 volts. In some embodiments, the electronic signal may have a frequency in the range of approximately 100 Khz to 10 Mhz. In any event, the ionic bond of water molecules is ruptured along the surface of isolated plates 115 positioned between electrically charged plates 117.

Figure 3:
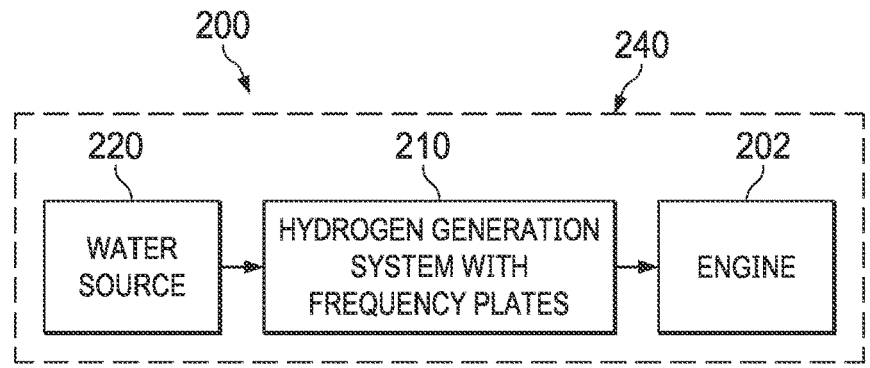
FIGS. 3B-3C are top, cross-sectional views of various embodiments of the water chamber of the HHO gas generator system of the disclosure.
Figure 4:
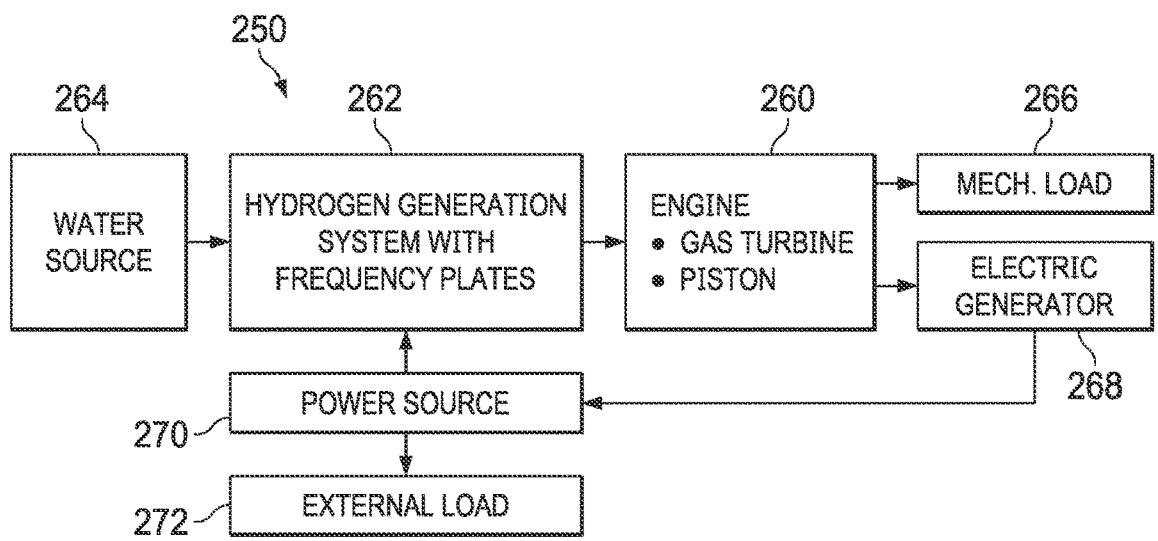
FIG. 4 is a schematic of power generation systems employing the net-positive, non-electrolysis HHO gas generator system of the disclosure with an electrical feedback loop and external load.

FIGS. 3 and 4 illustrate various hydrogen power systems employing frequency plates and voltage fields wherein a water source is shown supplying water to such a hydrogen generation system as generally described above. The system produces hydrogen gas that can them be pumped to an internal combustion engine, where the hydrogen can be combusted to drive the engine. In one or more embodiments, the internal combustion engine may be a gas turbine. In other embodiments, the internal combustion engine may be a piston engine. Regardless of the type of internal combustion engine, an additional benefit to the hydrogen power system described herein is that the gas and vapor expelled from combustion of the HHO gas is air and water vapor. In other words, the exhaust port of the internal combustion engine is a water vapor outlet. In any event, the engine can be utilized to either drive a mechanical load, such as a vehicle drive system or other equipment, or drive an electric generator, or both. The electric generator, in turn, can provide power back to the hydrogen generation system to facilitate operation of the system. In this regard, the electricity generated by the electric generator may be stored in a battery, capacitor or similar power storage system, which may also be used to provide electricity to an external load, such as an electric vehicle, electrical equipment or an electric grid.

FIG. 3 illustrates a power generation system 200 which employs frequency plates and voltage fields. In the illustrated embodiment, an internal combustion engine 202 is driven by HHO gas. The HHO gas is derived from a hydrogen generation system 210 that employs frequency plates and voltage fields applied to a volume of water to generate the HHO gas. A water source 220 supplies water to the hydrogen generation system 210 in order to supply on-going operation of hydrogen generation system 210, and thus, internal combustion engine 202, over a period of time. In one or more embodiments, internal combustion engine 202 is deployed in a vehicle 240 and water source 220 is a reservoir carried by the vehicle 240, along with hydrogen generation system 210, to provide power to vehicle 240.

FIG. 4 illustrates another embodiment of a power generation system 250 which employs frequency plates and voltage fields. In the illustrated embodiment, an internal combustion engine 260 is driven by HHO gas. The HHO gas is derived from a hydrogen generation system 262 that employs frequency plates and voltage fields applied to a volume of water to generate the HHO gas. A water source 264 supplies water to the hydrogen generation system 262 in order to supply on-going operation of hydrogen generation system 262, and thus, internal combustion engine 260, over a period of time. The system 262 produces hydrogen gas that can them be pumped to an internal combustion engine 260, where the hydrogen can be combusted to drive the engine 260. In one or more embodiments, the internal combustion engine may be a gas turbine. In other embodiments, the internal combustion engine may be a piston engine. Regardless of the type of engine 260, the engine can be utilized to either drive a mechanical load, such as a vehicle drive system or other equipment 266, or drive an electric generator 268, or both. Where an electric generator 268 is included, the electric generator 262, in turn, can feed electrical power back to the hydrogen generation system 262 in a loop to facilitate operation of the system 262. In this regard, electricity generated by the electric generator 268 may be stored in a power storage system 270, such as a battery, capacitor or similar power storage system, which may also be used to provide electricity to an external load 272, such as a vehicle electric system, electrical equipment or an electric power grid.

Figure 5:
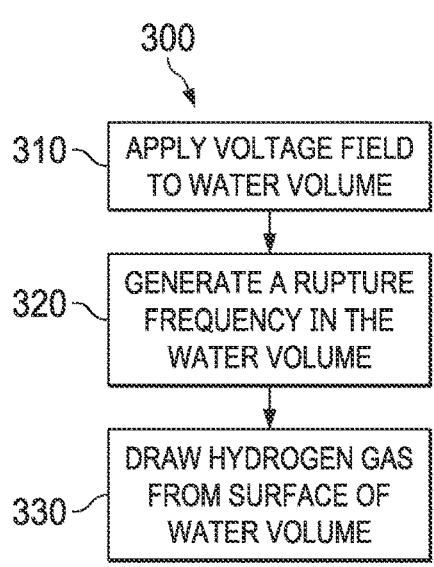
FIG. 5 is a flow chart illustrating a method for generating HHO gas.

FIG. 5 is a flow chart illustrating a method 300 for generating HHO gas. The method 300 uses a non-electrolysis process to separate water molecules into its constituent gases. In a first step 310, a voltage is applied to a volume of water. In a second step 320, a rupture frequency is simultaneously applied across the voltage field generated in the volume of water in order to promote rupture of water molecules along the surface of isolated conductors deployed in the voltage field. The rupture molecules result in HHO gas along the surface of the isolated conductors. The HHO gas migrates to the surface of the volume of water where, in step 330, HHO gas is drawn from the volume of water. The HHO gas can then be utilized as combustion fuel, such as in an internal combustion engine or gas turbine.

Figure 6:
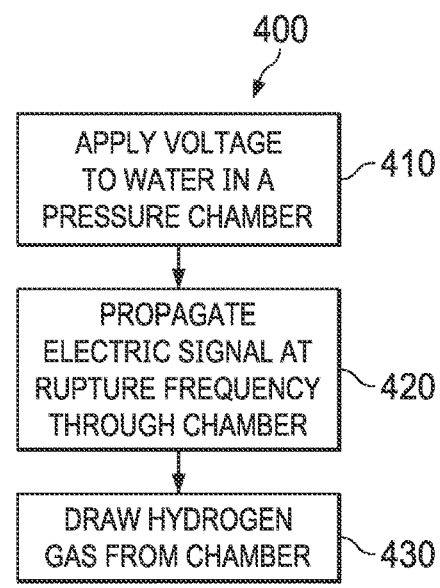
FIG. 6 is a flow chart illustrating operation the hydrogen generator of the disclosure.

FIG. 6 is a flow chart illustrating a method 400 for generating HHO gas. The method 400 uses a non-electrolysis process to separate water molecules into its constituent gases. In a first step 410, a volume of potable water is disposed in a pressure chamber, such hermetically sealed housing 110 described above, and a voltage is applied to the volume of water. In one or more embodiments, the voltage is applied via conductive rods 114a and 114b and polarity transducers 117. This generates an electrical field in a zone defined between oppositely charged transducers 117, such as transducers 117a and 117b. Disposed within the zone are one or more isolated transducers 115.

In a second step, while the electric field is being generated in the described zones, a rupture frequency (fR) is transmitted via conductive frequency plates 146 throughout the housing 110. In one or more embodiments, the frequency plates oppose one another, bounding a zone where the electrical field is generated. The exposed surface of the isolated transducers 115 functions as a rupture point or surface, so that as the rupture frequency signal contacts water molecules along the exposed surface of the isolated transducers, using the rupture frequency (fR), an electronic disorganization of the electrostatic ionic bonds of water molecules on the surface of the isolated transducers 115 occurs, causing rupture of the water molecules and consequently the release of hydrogen-oxygen gases. The released gasses then rise to the surface 142 of the volume of water.

In step 430, a negative pressure (−PΔ) is exerted adjacent the surface 142 of the volume of water, such as by a negative low-pressure pump 166, thereby assisting in the natural expansion of gases once the gases bubble up to the surface 142 of the volume of water. The hydrogen-oxygen gases are then drawn under negatives pressure from the housing 110 and propagated downstream for various applications.

Thus a hydrogen generator has been described. The hydrogen generator may include a housing in which an interior water chamber is defined; a first electrode extending into the interior water chamber; a second electrode extending into the interior water chamber; a first plurality of transducers positioned within the chamber and spaced apart from one another; a second plurality of transducers positioned within the chamber and in electrical communication with the first electrode, the second plurality of transducers spaced apart from the first plurality of transducers; a third plurality of transducers position within the chamber and in electrical communication with the second electrode, the third plurality of transducers spaced apart from the first and second plurality of transducers; and a first frequency plate and a second frequency plate spaced apart from one another and mounted adjacent the transducers. In other embodiments, a hydrogen generator may include a housing in which an interior water chamber is defined; a first electrode extending into the interior water chamber; a second electrode extending into the interior water chamber; at least one first set of isolated transducers positioned within the chamber and spaced apart from one another; at least one first polarity transducer positioned within the chamber and in electrical communication with the first electrode, the at least one first polarity transducer spaced apart from the at least one first set of isolated transducers; at least one second polarity transducer position within the chamber and in electrical communication with the second electrode, the at least one second polarity transducer spaced apart from the at least one first set of isolated transducers and the at least one first polarity transducer; and a frequency propagation mechanism disposed adjacent the interior water chamber. Relatedly, a hydrogen power system has been described. The hydrogen power system may include a water source; a hydrogen generator comprising a housing in which an interior water chamber is defined; a first electrode extending into the interior water chamber; a second electrode extending into the interior water chamber; at least one first set of isolated transducers positioned within the chamber and spaced apart from one another; at least one first polarity transducer positioned within the chamber and in electrical communication with the first electrode, the at least one first polarity transducer spaced apart from the at least one first set of isolated transducers; at least one second polarity transducer position within the chamber and in electrical communication with the second electrode, the at least one second polarity transducer spaced apart from the at least one first set of isolated transducers and the at least one first polarity transducer; and a frequency propagation mechanism disposed adjacent the interior water chamber; and an internal combustion engine.

For any one of the forgoing embodiments, one or more of the following elements may be included, alone or in combination with other elements:

The frequency propagation mechanism comprises a first frequency plate and a second frequency plate spaced apart from one another and mounted adjacent the transducers.

The frequency propagation mechanism is a laser.

At least one first set of isolated transducers comprises a plurality of isolated transducers.

At least one first set of isolated transducers comprises at least one isolated transducers.

At least one first set of isolated transducers comprises at least two isolated transducers.

At least one first set of isolated transducers comprises at least three isolated transducers.

At least one first set of isolated transducers comprises at least four or more isolated transducers.

At least two sets of isolated transducers are positioned within the chamber and spaced apart from one another.

At least three sets of isolated transducers are positioned within the chamber and spaced apart from one another.

At least four or more sets of isolated transducers are positioned within the chamber and spaced apart from one another.

Each set of isolated transducers is bounded by a positive transducer and a negative transducer.

At least one transducer is a round plate having a first side and a second side and a perimeter.

Water disposed in the interior water chamber.

Water disposed in the interior water chamber is potable water.

Water disposed in the interior water chamber electrolyte free.

A frequency source having a first lead attached to the first frequency plate and a second lead attached to the second frequency plate.

A frequency source having a first positive lead electrically attached to the first frequency plate and a second negative lead electrically attached to the second frequency plate.

The frequency source has a range of at least 100 Khz to 10 Mhz.

The frequency source is a signal generator.

A voltage source electrically attached to the first and second electrodes.

The first electrode is a positive electrode and electrically connected to a positive lead of the voltage source and the second electrode is a negative electrode and electrically connected to a negative lead of the voltage source.

The voltage source is an approximately 12-volt voltage source.

The voltage source is an approximately 48-volt voltage source.

The voltage source is a 12-volt direct current vehicle battery.

The voltage source is a battery.

The first, second and third pluralities of transducers are mounted between the first and second frequency plates.

The housing is formed of a housing wall having an exterior surface and an interior surface.

The housing has a first surface spaced apart from a second surface with a housing wall extending between the first and second surfaces to define the interior water chamber.

The housing is defined along a substantially vertical axis, wherein the first surface is an upper surface and the second surface is a lower surface.

The housing wall is circular in cross-section.

The housing wall is oval in cross-section.

The housing wall is formed of at least three sides.

The housing wall is square in cross-section.

The housing has a length along the vertical axis that is at least twice diameter of the cross-section of the housing wall.

The housing is an elongated cylinder.

The housing is sealed from the atmosphere.

The housing is non-conductive.

The housing is an elongated prism.

The elongated prism has a square cross-section.

The interior water chamber has a volume of at least 1000 ml.

The hydrogen generator of claim 1, wherein the housing comprises a first fluid port and a second fluid port.

The first fluid port is a gas outlet.

The second fluid port is a water inlet.

A water source in fluid communication with the first fluid port.

The water source is a water storage tank.

A water pump disposed to pump water from the water storage tank to the first fluid port.

A gas pump in fluid communication with the second fluid port.

The gas pump is a low-pressure pump.

The gas pump is a vacuum pump.

The frequency plates are spaced apart from the interior water chamber.

The frequency plates are positioned along the exterior surface of a housing wall defining the interior water chamber.

The frequency plates are ferrite elements.

The frequency plates are elongated strips.

The frequency plates oppose one another.

The frequency plates oppose one another on opposite sides of the chamber.

The two spaced apart frequency plates are spaced approximately 180 degrees apart from one another about the circumference of the housing.

The two spaced apart frequency plates are mounted on opposing walls of the housing.

Each frequency plate is semicircular in shape.

The hydrogen generator of claim 1, further comprising a plurality of first frequency plates and a plurality of second frequency plates.

The plurality of first frequency plates and the plurality of second frequency plates are interleaved within one another about the perimeter of the housing.

The frequency plates are elongated and extend along substantially the length of the housing.

The frequency plates are elongated and extend along substantially the stack length of the first plurality of transducers.

The frequency plates are elongated and extend along substantially the stack length of one of the second or third plurality of transducers.

The frequency plates are mounted on the exterior surface of the housing wall.

The frequency plates are spaced apart from the interior water chamber.

The transducer comprises an electrically conductive plate.

A first plurality of transducers positioned within the chamber and spaced apart from one another.

A second plurality of transducers positioned within the chamber and in electrical communication with the first electrode, the second plurality of transducers spaced apart from the first plurality of transducers.

A third plurality of transducers position within the chamber and in electrical communication with the second electrode, the third plurality of transducers spaced apart from the first and second plurality of transducers.

A gas turbine in fluid communication with the second fluid port.

An electric generator.

An electric generator electrically coupled to the power source.

An electric generator, wherein the internal combustion engine is mechanically coupled to the electric generator and the electric generator is electrically coupled to the power source.

A mechanical load coupled to the internal combustion engine.

A mechanical load coupled to the internal combustion engine, wherein the mechanical load is a vehicle or equipment.

The internal combustion engine is a piston engine.

The internal combustion engine is a turbine engine.

An electric generator coupled to the driveshaft of the internal combustion engine.

The internal combustion engine comprises an exhaust port.

The exhaust port of the internal combustion engine is a water vapor outlet.

An external electric load electrically connected to the power source.

The external electric load is a vehicle electric system.

The external electric load is electrical equipment.

The external electric load is an electric grid.

A method for generating hydrogen from water has been described. In one or more embodiments, the method may include applying a voltage field to a volume of water; simultaneously, generating a frequency field across the volume of water; and drawing hydrogen gas and oxygen gas from the surface of the volume of water. In other embodiments, the method may include applying a voltage across water within a pressure chamber; propagating an electronic signal at a select frequency through the water; and drawing hydrogen gas and oxygen gas from the pressure chamber.

For any one of the forgoing embodiments of the hydrogen generation method, one or more of the following elements may be included, alone or in combination with other elements:

Applying negative pressure to the surface of the water within the pressure chamber.

Simultaneously, applying a negative pressure to the surface of the volume of water.

Rupture the ionic bond of water molecules, splitting the water molecules into hydrogen gas and oxygen gas.

Drawing hydrogen gas and oxygen gas from the surface of the volume of water.

Splitting the water molecules at the surface of conductive plates disposed within the voltage field.

The voltage is a constant voltage.

The voltage is direct current voltage.

The voltage is approximately 12 volts.

The voltage ranges from approximately 12-48 volts.

The electronic signal has a frequency in the range of approximately 100 Khz to 10 Mhz.

Rupturing the ionic bond of water molecule along plates positioned between electrically charged plates.

Positioning electrically isolated plates within the electric field and rupturing the ionic bond of water molecule along plates.

Although the present disclosure and its advantages have been described in detail, it should be understood that various changes, substitutions and alterations can be made herein without departing from the spirit and scope of the disclosure as defined by the following claims.

What is claimed is:

1. A hydrogen generator comprising:
   a housing in which an interior water chamber is defined;
   a first electrode extending into the interior water chamber;
   a second electrode extending into the interior water chamber;
   a first plurality of transducers positioned within the chamber and spaced apart from one another;
   a second plurality of transducers positioned within the chamber and in electrical communication with the first electrode, the second plurality of transducers spaced apart from the first plurality of transducers;
   a third plurality of transducers position within the chamber and in electrical communication with the second electrode, the third plurality of transducers spaced apart from the first and second plurality of transducers; and
   a first frequency plate and a second frequency plate spaced apart from one another and mounted adjacent the transducers.

2. The generator of claim 1, wherein at least one transducer is a round plate having a first side and a second side and a perimeter.

3. The generator of claim 1, further comprising water disposed in the interior water chamber.

4. The generator of claim 3, wherein the water disposed in the interior water chamber is potable water.

5. The generator of claim 3, wherein the water disposed in the interior water chamber electrolyte free.

6. The generator of claim 1, further comprising a frequency source having a first lead attached to the first frequency plate and a second lead attached to the second frequency plate.

7. The generator of claim 1, further comprising a frequency source having a first positive lead electrically attached to the first frequency plate and a second negative lead electrically attached to the second frequency plate.

8. The generator of claim 7, wherein the frequency source has a range of at least 100 Khz to 10 Mhz.

9. The generator of claim 1, wherein the housing is formed of a sealed housing wall having an exterior surface and an interior surface, wherein the frequency plates are mounted on the exterior surface of the housing.

10. The generator of claim 9, wherein the housing is defined along a substantially vertical axis, and the housing wall is circular in cross-section to form an elongated cylinder.

11. The generator of claim 9, wherein the housing comprises a first fluid port and a second fluid port, wherein the first fluid port is a gas outlet in fluid communication with a gas pump, and the second fluid port is a water inlet in fluid communication with a water source.

12. A hydrogen generator comprising:
    a housing in which an interior water chamber is defined;
    a first electrode extending into the interior water chamber;
    a second electrode extending into the interior water chamber;
    at least one first set of isolated transducers positioned within the chamber and spaced apart from one another;
    at least one first polarity transducer positioned within the chamber and in electrical communication with the first electrode, the at least one first polarity transducer spaced apart from the at least one first set of isolated transducers;
    at least one second polarity transducer position within the chamber and in electrical communication with the second electrode, the at least one second polarity transducer spaced apart from the at least one first set of isolated transducers and the at least one first polarity transducer; and
    a frequency propagation mechanism disposed adjacent the interior water chamber.

13. The generator of claim 12, wherein the frequency propagation mechanism comprises a first frequency plate and a second frequency plate spaced apart from one another and mounted adjacent the transducers.

14. The generator of claim 12, wherein the frequency propagation mechanism is a laser.

15. The generator of claim 12, wherein the at least one first set of isolated transducers comprises a plurality of isolated transducers.

16. The generator of claim 15, at least two sets of isolated transducers positioned within the chamber and spaced apart from one another.

17. The generator of claim 16, wherein each set of isolated transducers is bounded by a positive polarity transducer and a negative polarity transducer.

* * * * *